(12) United States Patent
Cacas-Stentz et al.

(10) Patent No.: US 10,458,208 B2
(45) Date of Patent: Oct. 29, 2019

(54) METHOD OF DEVELOPING HYDROCARBONS IN A SEDIMENTARY BASIN, BY MEANS OF BASIN SIMULATION

(71) Applicant: IFP Energies nouvelles, Rueil-Malmasion (FR)

(72) Inventors: Marie-Christine Cacas-Stentz, Rueil-Malmaison (FR); Mathieu Ducros, Rueil-Malmaison (FR); Virgile Rouchon, Vaucresson (FR); Sylvie Wolf, Rueil-Malmaison (FR)

(73) Assignee: IFP Energies nouvelles, Rueil-Malmasion (FR)

( * ) Notice: Subject to any disclaimer, the term of this patent is extended or adjusted under 35 U.S.C. 154(b) by 628 days.

(21) Appl. No.: 15/088,486

(22) Filed: Apr. 1, 2016

(65) Prior Publication Data

US 2016/0290107 A1    Oct. 6, 2016

(30) Foreign Application Priority Data

Apr. 3, 2015 (FR) ...................................... 15 52919

(51) Int. Cl.
*G06G 7/48* (2006.01)
*E21B 43/00* (2006.01)
*E21B 41/00* (2006.01)
*G01V 99/00* (2009.01)
*G06F 17/10* (2006.01)

(52) U.S. Cl.
CPC .............. *E21B 43/00* (2013.01); *E21B 41/00* (2013.01); *G01V 99/00* (2013.01); *G06F 17/10* (2013.01)

(58) Field of Classification Search
None
See application file for complete search history.

(56) References Cited

U.S. PATENT DOCUMENTS

| | | | |
|---|---|---|---|
| 9,470,068 B2* | 10/2016 | Kacewicz | G01V 99/005 |
| 2011/0290478 A1* | 12/2011 | Sun | G01V 99/00 |
| | | | 166/250.01 |
| 2012/0136636 A1* | 5/2012 | Kleine | G01V 99/005 |
| | | | 703/2 |

(Continued)

OTHER PUBLICATIONS

Hantschel et al. Fundamentals of Basin and Petroleum Systems Modeling Springer Verlag Berlin Heidelberg, 2009, p. 151-340.*

(Continued)

*Primary Examiner* — Aniss Chad
*Assistant Examiner* — Cuong V Luu
(74) *Attorney, Agent, or Firm* — Fitch, Even, Tabin & Flannery LLP (57) ABSTRACT

This invention is a method of developing a sedimentary basin containing hydrocarbons, by using basin simulation. Starting with gridded representations representative of a basin for each time step of a simulation, for each time step and in each cell of the gridded representation the following steps are performed. First a determination of at least one amount of biogenic gas produced in the cell for the time step is preformed followed by determining at least one amount of biogenic gas dissolved in water present in the cell at the time step, and determining therefrom an amount of free biogenic gas in the cell at the time step; then, accounting for advective transport of the quantity of biogenic gas dissolved in the water of the cell at the time step.

9 Claims, 3 Drawing Sheets

(56) References Cited

U.S. PATENT DOCUMENTS

| | | | | |
|---|---|---|---|---|
| 2012/0191432 | A1* | 7/2012 | Khataniar | E21B 43/00 703/10 |
| 2012/0203515 | A1* | 8/2012 | Pita | E21B 49/00 703/2 |
| 2013/0218538 | A1* | 8/2013 | Fuecker | G06F 17/5018 703/2 |
| 2015/0066461 | A1* | 3/2015 | Kacewicz | E21B 43/00 703/10 |
| 2015/0205001 | A1* | 7/2015 | Carruthers | G06T 17/05 703/2 |
| 2015/0323701 | A1* | 11/2015 | Mesri | E21B 43/00 703/2 |
| 2016/0070024 | A1* | 3/2016 | Berard | G01V 99/005 703/10 |
| 2016/0084081 | A1* | 3/2016 | Lawson | E21B 49/088 166/250.01 |

OTHER PUBLICATIONS

Hantschel et al. Fundamentals of Basin and Petroleum Systems Modeling Springer Verlag Berlin Heidelberg, 2009, p. 31-101.*

Guangren et al. Finite Volume Method for Solving a Modified 3-D 3-Phase Balck-Oil Hydrocarbon Secondary Migration Mmodel, and Its Application to the Kuqa Depression of the Tarim Basin in Western China Advances in Petroleum Exploration and Development, vol. 2 No. 1 ,2011, pp. 1-12.*

Schneider et al. A 3D Basin Model for Hydrocarbon Potential Evaluation Application to Congo Offshore Oil & Gas Science and Technology—Rev IFP, vol. 55 (2000) No. 1, pp. 3-13.*

Waite et al. Gas Hydrate Fromation Rates From Dissolved-Phase Methane in Porous Laboratory Specimens Geophysical Research Letters, vol. 40, Issue 16 (Year: 2013).*

Schneider et al. Quantitative HC Potential Evaluation Using 3D Basin Modeling: Application to Franklin structure, Central Graben, North Sea, UK Marine and Petroleum Geology 17, pp. 841-856 (Year: 2000).*

Schneider Modeling Multiphase Flow of Petroleum at the Sedimentary Basin Scale Journal of Geochemical Exploration 78-79, pp. 693-696 (Year: 2003).*

Schneider et al. A 3D Basin Model for Hydrocarbon Potential Evaluation: Application to Congo Offshore Oil & Gas Science and Technology vol. 55, No. 1, pp. 3-13 (Year: 2000).*

Irving Langmuir, "The Constitution and Fundamental Properties of Solids and Liquids", Contribution from Research Laboratory of the General Electric Company, Schenectady, NY, Sep. 5, 1916, 75 pages.

F. Schneider et al., "Quantitative HC potential evaluation using 3D basin modelling: application to Franklin structure, Central Graben, North Sea, UK", Marine and Petroleum Geology 17 (2000), pp. 841-856.

F. Schneider et al., "A 3D Basin Model for Hydrocarbon Potential Evaluation: Application to Congo Offshore", Oil & Gas Science and Technology—Rev. IFP, vol. 55, (2000), No. 1, pp. 3-13.

Frederic Schneider, "Modeling multiphase flow of petroleum at the sedimentary basin scale", Journal of Geochemical Exploration, vol. 78-79, (2003), pp. 693-696.

Daniel J.F. Carruthers, "Transport Modelling of Secondary Oil Migration Using Gradient-Driven Invasion Percolation Techniques", (thesis submitted for the degree of Doctor of Philosophy), Department of Petroleum Engineering, Heriot-Watt University, Edinburgh, Scotland UK, 333 pages.

Zhenhao Duan et al., "A thermodynamic model for calculating methane solubility, density and gas phase composition of methane-bearing aqueous fluids from 273 to 523 K and from 1 to 2000 bar", Geochimica et Cosmochimica Acta, vol. 70, (2006), pp. 3369-3386.

Moretti et al., "KINE3D: a New 3D Restoration Method Based on a Mixed Approach Linking Geometry and Geomechanics", Oil & Gas Science and Technology—Rev. IFP, vol. 61, (2006), No. 2, pp. 277-289.

R. Scheichl et al., "Decoupling and Block Preconditioning for Sedimentary Basin Simulations", Kluwer Academic Publishers, (printed in the Netherlands), (2003), pp. 1-24.

M.S. Steckler et al., "Subsidence of the Atlantic-Type Continental Margin Off New York", Earth and Planetary Science Letters, vol. 41, (1978), pp. 1-13.

Sylta, " Modelling of secondary migration and entrapment of a multicomponent hydrocarbon mixture using equation of state and ray-tracing modelling techniques", Petroleum Migration Geological Society, Special Publication No. 59, pp. 111-122.

Robert Eymard et al., "Finite Volume Methods", Handbook for Numerical Analysis, Ph. Ciarlet J.L. Lions eds, North Holland, (2000) 253 pages.

* cited by examiner

Figure 4D

METHOD OF DEVELOPING HYDROCARBONS IN A SEDIMENTARY BASIN, BY MEANS OF BASIN SIMULATION

CROSS REFERENCE TO RELATED APPLICATION

Reference is made to French Patent Application No. 15/52.919, which is incorporated herein by reference in its entirety.

BACKGROUND OF THE INVENTION

Field of the Invention

The present invention relates to the field of petroleum reservoir or geological gas storage site exploration and development.

Description of the Prior Art

Petroleum exploration seeks hydrocarbon reservoirs within a sedimentary basin. Understanding the principles of hydrocarbon genesis and the connections thereof with the subsurface geological history has allowed development of methods for assessing the petroleum potential of a sedimentary basin. The general procedure for assessing the petroleum potential of a sedimentary basin comprises shuttles between:

a prediction of the petroleum potential of the sedimentary basin, from available data relative to the basin being studied (outcrops, seismic surveys, drilling data for example). The goal of this prediction is to:

better understand the architecture and the geological history of the basin being studied, notably to study whether hydrocarbon maturation and migration processes may have taken place;

identify the subsurface zones where these hydrocarbons may have accumulated;

define which zones have the best economic potential, evaluated from the volume and the nature of the hydrocarbons probably trapped (viscosity, rate of mixing with water, chemical composition, etc.), as well as their operating cost (controlled for example by the fluid pressure and depth); and exploratory drilling operations in the various zones having the best potential, in order to confirm or invalidate the previously predicted potential and to acquire new data intended to support new and more precise studies.

Petroleum development of a reservoir includes, from data collected during the petroleum exploration phase, selection of the reservoir zones with the best petroleum potential, in defining optimum development schemes for these zones (using reservoir simulation for example in order to define the numbers and positions of the development wells allowing optimum hydrocarbon recovery), in drilling development wells and, in general terms, putting in place the production infrastructures necessary for reservoir development.

In some sedimentary basins having a complicated geological history involving many physical processes, or when the volume of data is very large, petroleum potential assessment of a sedimentary basin requires software tools for synthesizing the available data, as well as software tools for simulation of the geological history and of the many physical processes that govern it. This procedure is referred to as "basin modelling". The family of softwares referred to as basin modelling softwares allows simulation in one, two or three dimensions the sedimentary, tectonic, thermal, hydrodynamic, organic and inorganic chemical processes involved in the formation of a petroleum basin. Basin modelling conventionally comprises three stages:

a stage for constructing a gridded representation of the basin being studied, known as geomodelling. This gridded representation is most often structured in layers, that is a group of cells is assigned to each geological layer of the modelled basin. Then, each cell of this gridded representation is filled with one or more petrophysical properties, such as porosity, facies (clay, sand, etc.) or their organic matter content at the time of their sedimentation. The construction of this model is based on data acquired through seismic surveys, measurements while drilling, core drilling, etc.;

a stage of structural reconstruction of this gridded representation representing prior states of the basin architecture. This stage can be carried out using a method referred to as backstripping (Steckler et al., 1978) or a method referred to as structural restoration (EP-2,110,686); and a stage of numerical simulation of a selection of physical phenomena taking place during the basin evolution and contributing to the formation of oil traps. This stage, known as basin simulation, is based on a discretized representation of space and time. In particular, a basin simulation provides predictive mapping of the subsoil showing the probable location of the reservoirs, as well as the proportion, the nature and the pressure of the hydrocarbons trapped therein.

By providing quantitative and reliable information, this integrated basin modelling procedure allows the success rate to be increased when drilling an exploration well.

The following documents are mentioned in the description:

Carruthers, Transport of Secondary Oil Migration Using Gradient-Driven Invasion Percolation Techniques. PhD thesis, Heriot-Watt University, Edinburgh, Scotland, UK, 1998.

De Marsily G., Quantitative Hydrogeology, Academic Press, 1986.

Duan and Mao, A Thermodynamic Model for Calculating Methane Solubility, Density and Gas Phase Composition of Methane-Bearing Aqueous Fluids from 273 to 523 K and from 1 to 2000 bar, Geochimica et Cosmochimica Acta 70 (2006) 3369-3386.

Langmuir I., The Constitution and Fundamental Properties of Solids and Liquids. Part i. Solids.; J. Am. Chem. Soc. 38, 2221-95 1916.

R. Eymard, T. Gallouet, R. Herbin, The Finite Volume Method, Handbook for Numerical Analysis, Ph. Ciarlet J. L. Lions eds, North Holland, 2000.

I. Moretti, F. Lepage et M. Guiton, "KINE3D: A New 3D Restauration Method Based on a Mixed Approach Linking Geometry and Geomechanics", Oil & Gas Science and Technology—Rev. IFP, Vol. 61 (2006), no 2, pp 277-289.

R. Scheichl, R. Masson, J. Wendebourg, Decoupling and Block Preconditioning for Sedimentary Basin Simulations, Computational Geosciences 7(4), pp. 295-318, 2003.

Schneider et Wolf, Quantitative HC Potential Evaluation Using 3D Basin Modelling: Application to Franklin structure, Central Graben, North Sea, UK». Marine and Petroleum Geology 17 (2000) 841-856.

Schneider F., Modelling Multi-Phase Flow of Petroleum at the Sedimentary Basin Scale. Journal of Geochemical exploration 78-79 (2003) 693-696).

F. Schneider, S. Wolf, I. Faille, D. Pot, A 3D Basin Model for Hydrocarbon Potential Evaluation: Application to Congo Offshore, Oil & Gas Science and Technology—Rev. IFP, Vol. 55 (2000), No. 1, pp. 3-13.

Steckler, M. S., and A. B. Watts, Subsidence of the Atlantic-Type Continental Margin off New York, Earth Planet. Sci. Lett., 41, 1-13, 1978.

Sylta, Modeling of Secondary Migration and Entrapment of a Multicomponent Hydrocarbon Mixture Using Equation of State and Ray-Tracing Modeling Techniques, Petroleum Migration, Geological Society, Special publication no 59, pp. 111-112, 1991.

Among the physical phenomena taken into account in the basin simulation stage described above, the following is simulated, among others:

the formation of hydrocarbons, notably from the organic matter initially buried with the sediments; and the transport of hydrocarbons, known as migration, from the rocks where they have formed to those where they are trapped.

The basin simulation methods according to the prior art allow simulation of three possible hydrocarbon formation processes:

by chemical transformation of the organic matter under the effect of the high temperatures prevailing in the deep subsoil (WO-2014/040,622 A1); This is the production of thermogenic hydrocarbons; and by direct action of some micro-organisms present deep in the sediments, which degrade the initial organic matter by producing notably methane; it is referred to as primary biogenic production (WO-2014/040,622 A1), by action of some micro-organisms in the deep subsoil, which degrade some hydrocarbons by producing notably methane; This is referred to as secondary biogenic production (WO-2003/031,644 A3).

The basin simulation methods according to the prior art allow simulation of the migration of the hydrocarbons produced, such as primary and secondary biogenic gas, by assuming that they travel in form of one or more phases, separate from the aqueous phase, generally referred to as "free gas". There are several methods for modelling free gas migration: the ray tracing method (Sylta, 1991), the invasion-percolation method (Carruthers, 1998) and the solution of the generalized Darcy equations (Schneider, 2003).

However, the simulation of the hydrocarbon migration stage according to the prior art does not take account for a possible biogenic gas transport vector, whether the gas is of primary or secondary origin and the advective transport of part of the biogenic gas that may be dissolved in water present in the basin.

Indeed, sedimentary basins have porous rocks having pores which are initially filled with water which may be sea water if the sediments have accumulated in a marine environment, and rain water if the sediments have accumulated in a continental environment. This water is referred to as "poral water" or "formation water". Moreover, during the evolution of the basin, water can circulate in the pore network under the effect of a pressure field. The latter is controlled for example by the deposition of new sediments that tend to overload the rock skeleton and to expel the water from the rock, or by the emergence of a relief that will impose a hydraulic head and create a subsurface flow from the highest zones to a lower outlet.

Depending on various parameters (pressure and temperature conditions, water salinity, etc.), biogenic gas may be potentially dissolved in this poral water and, this water circulating within the basin, the biogenic gas may be potentially transported by this water. For example, in the case of methane, the solubility thereof in water is sufficient for the advective transport by water to drive economically interesting volumes of methane towards oil deposits. Indeed, approximately 1 $m^3$ methane (corrected to ambient conditions) can be dissolved in 1 $m^3$ water at a depth of 1000 m. Thus, in a 1-$km^2$ and 10 m-thick sedimentary layer located at a depth of 1000 m and having 25% porosity, up to 2.5 million $m^3$ of methane can be dissolved (corrected to ambient conditions). It thus appears that large amounts of biogenic gas can be dissolved in poral water and therefore transported over geologic time by this water within a basin.

Then, depending on the pressure and temperature conditions encountered over geologic times, biogenic gas, dissolved and transported by advection can be partially released as free gas, which itself undergoes a migration according to the prior art, and therefore potentially leads to accumulations in economic quantities in some zones of a basin. Thus, not taking into account, in a basin simulation, the transport of biogenic gas in dissolved form via the formation water of a basin can lead to significant errors concerning the prediction of the location of hydrocarbon accumulations within a basin. It is therefore essential to be able to model biogenic gas migration in order to have more precise basin simulations.

SUMMARY OF THE INVENTION

The present invention relates to a hydrocarbon migration simulation method including a stage of modelling the biogenic gas production, and a stage allowing simulation of the migration, through advection, of at least part of this gas dissolved in the water present in the basin and prediction of the resulting amount of free gas. The present invention also relates to a method of developing a sedimentary basin comprising hydrocarbons. Using a basin simulator which allows reconstruction, for a succession of time steps, the geological and geochemical processes that have affected the basin from a geological time t to the current time, from the measurement of properties relative to the basin. The method comprises the following stages:

A. constructing a gridded representation representative of the basin at current time from the measurements;

B. from the gridded representation at the current time, constructing a gridded representation of the basin for other time steps through reconstruction of the architecture of the basin for the other time steps;

C. by use of the simulator and of the gridded representations of the basin for the time steps, carrying out at least the following stages for each of the time steps, from the geological time t to the current time, and for each cell of the gridded representation:

i. determining at least one amount of biogenic gas produced in the cell at the time step;

ii. determining at least one amount of biogenic gas dissolved in the water present in the cell at the time step, and deducing therefrom an amount of free biogenic gas in the cell at the time step, iii. taking at least into account the advective transport of the amount of biogenic gas dissolved in the water of the cell at the time step, D. selecting the zones of the basin corresponding to cells of the gridded representation of the basin at the current time comprising hydrocarbons, and developing the basin as a function of the selected zones.

Advantageously, an amount of biogenic gas of primary origin and/or of secondary origin can be determined.

According to one embodiment of the invention, it is possible to determine, for each of the time steps and in each of the cells of the gridded representation obtained for the time step, the amount of biogenic gas dissolved in the water as follows:

a) calculating a total amount of biogenic gas in the cell for the time step by adding the amount of biogenic gas produced at the time step and the amount of biogenic gas present in the cell at the previous time step;
   b) determining a maximum amount of biogenic gas solubilizable in the water in the cell and at the time step;
   c) determining the amount of biogenic gas dissolved in the cell for the time step by taking the minimum value between the total amount of biogenic gas and the maximum amount of solubilizable biogenic gas.

According to an embodiment of the invention, it is possible to determine, for each of the time steps and in each of the cells of the gridded representation obtained for the time step, the amount of the free biogenic gas by difference between the total amount of biogenic gas present in the cell at the time step and the amount of biogenic gas dissolved in the water of the cell at the time step.

According to an embodiment of the invention, it is also possible to determine an amount of biogenic gas adsorbable in the cell at the time step, and the amount of biogenic gas dissolved in the cell and for the time step is determined considering that the biogenic gas is preferably adsorbed, then dissolved.

Furthermore, the invention relates to a computer program product downloadable from a communication network and/or recorded on a non-transient computer-readable medium and/or processor executable, comprising program code instructions for implementing the method according to the invention above, when the program is executed on a computer.

BRIEF DESCRIPTION OF THE FIGURES

Other features and advantages of the method according to the invention will be clear from reading the description hereafter of embodiments given by way of non-limitative example, with reference to the accompanying figures wherein.

DETAILED DESCRIPTION OF THE INVENTION

The following definitions are used in the description of the invention:

Basin simulation is a substage of basin modelling. Basin modelling is more general and comprises a substage of constructing a gridded representation and a substage of structural reconstruction. Basin simulation allows reconstruction of the geological and geochemical history of a basin, from a geological time t to the current time. Conventionally, in basin simulation, the period over which the history of a basin is reconstructed is discretized in "time steps";

Basin simulator is a software for carrying out numerical basin simulation using a computer;

A migration event groups together several time steps of a basin simulation. An event can correspond to a particular sedimentary deposit, and each surface delimiting the deposit can for example correspond to an erosion surface or a sedimentary deposit of different nature;

Biogenic gas is the gas produced by the action of microorganisms on organic matter (primary biogenic gas) or on already formed hydrocarbons (secondary biogenic gas);

Advection is in general terms is the transport of a (scalar or vector) quantity by a vector field. In the present case, it is the transport of biogenic gas, after dissolution, by the flow velocity of the poral water.

The invention relates to a method of developing a sedimentary basin, notably identification of zones of the basin, where hydrocarbons may have accumulated, and then extraction of these hydrocarbons.

Figure 1:
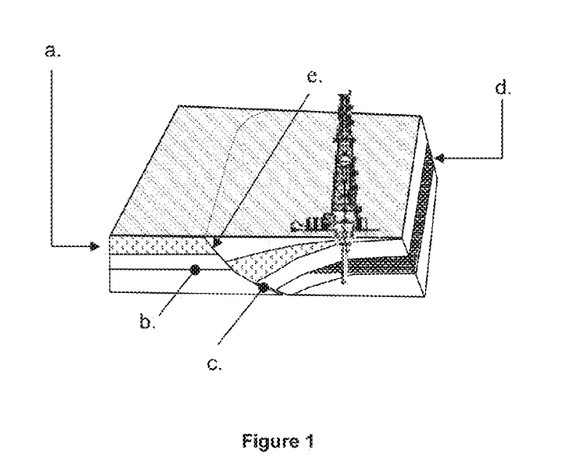
FIG. 1 diagrammatically shows the subsoil of a petroleum basin.

FIG. 1 diagrammatically shows a sedimentary basin comprising geological layers (an example of geological layers is shown in a), delimited by sedimentary interfaces (an example of sedimentary interfaces is shown in b) traversed by a fault or a break (e), and an accumulation of hydrocarbons (d) in one of the geological layers of the basin being considered (c).

The current architecture of a basin notably results from a deformation of the subsoil over geological times, comprising a minima a compaction of the layers due to the overload applied by the upper layers that have been progressively deposited, which can also involve breaks, along fault planes, resulting from tectonic forces. The nature of the hydrocarbons present in a sedimentary basin notably results from the pressure and temperature conditions to which the basin is subjected (more precisely, to which the organic matter and the already formed hydrocarbon compounds are subjected) over geological times. According to the prior art, at least part of the hydrocarbons which are formed migrate subsequently within the basin, for example by capillarity, buoyancy or pressure gradient difference between the various zones of the basin.

One object of the present invention is to better predict accumulations of gas of biological origin, referred to as biogenic gas, in the subsoil with a view to fossil resource exploration and exploitation. In particular, the present invention accounts for, during basin simulation, from a geological time t to the current time and at each time step of the simulation, the formation of biogenic gas, the transport (advection phenomenon) of at least part of this gas, after dissolution in water present in the basin, and to determine therefrom the resulting amount of free biogenic gas (in particular not dissolved).

The present invention requires:

measurements of properties relative to the basin which such measurements being carried out in situ (for example through core drilling, via logs obtained in wells, seismic acquisition surveys, etc.), at various points of the basin being studied, which are necessary for basin simulation, such as porosity, permeability, or lithology at the current time, a basin simulator according to the prior art, allowing reconstruction of the geological and geochemical processes that have affected the basin from a geological time t to the current time. According to the invention, the period over which the history of this basin is reconstructed is discretized in time steps. According to the invention, a gridded representation of the basin is available at the basin simulator input for each time step of the simulation. At each time step and in each cell of the gridded representation of the basin at the time step being considered, the basin simulator required for implementing the invention allows at least calculation of the following physical quantities: temperature, pressure, porosity and density of the rock contained in the cell being considered, water velocities, and the TOC (or organic matter concentration in the rock). According to an embodiment of the present invention, the basin simulator which is used also allows calculation of the amount of hydrocarbons of thermogenic origin. Calculation of the water velocities is given for example in the document (Marsily, 1986) and calculation of the other aforementioned physical quantities is for example described in the document (Schneider et al., 2000). Thus, basin simulation solves a system of differential equations describing the evolution over time of the physical quantities being studied. A discretization technique, such as the finite volume method, can therefore be used for example, as described for example in (Scheichl et al., 2003). According to the principle of the cell-centered finite volume methods, the unknowns are discretized by a constant volume per cell and the (mass or heat) conservation equations are integrated in space on each cell and in time between two successive time steps. The discrete equations then express that the quantity conserved in a cell at a given time step is equal to the quantity contained in the cell at the previous time step, which is increased by the flux of quantities that have entered the cell and decreased by the flux of quantities that have left the cell through its faces, plus external supplies. The TernisFlow™ software (IFP Energies nouvelles, France) is an example of such a basin simulator.

The present invention comprises at least the following stages:

1. Construction of a gridded representation of the basin at the current time
2. Structural reconstruction
3. Basin simulation In this stage, for each time step of the simulation and for each cell of the gridded representation, at least the following stages are carried out:

3.1 Hydrocarbon amount estimation

In this stage, the amount of biogenic gas produced in each cell of the gridded representation is estimated, among other things.

3.2 Hydrocarbon migration simulation

In this stage, the following stages are carried out, among others:

3.2.1 Estimation of the dissolved biogenic gas amount

In this stage, the amount of biogenic gas dissolved in water is calculated.

3.2.2 Simulation of the advective transport of dissolved biogenic gas

In this stage, the advective transport of the biogenic gas dissolved in water is simulated.

4. Development of the sedimentary basin

The main stages of the present invention are detailed hereafter.

1. Construction of a Gridded Representation of the Sedimentary Basin at the Current Time This stage constructs a gridded representation of the basin being studied at the current time. This basin model is generally represented in a computer, in form of a mesh or grid pattern with each cell being characterized by one or more properties relative to the basin (such as facies, porosity, permeability, saturation, or the organic matter content at the time of sedimentation). Construction of this model is based on data acquired during seismic surveys, measurements in wells, core drilling, etc.

More precisely, constructing a gridded representation of a basin discretizes in three dimensions the basin architecture, in assigning properties to each cell of this gridded representation and in adding boundary conditions to this representation to account for the interaction of the modelled zone with the environment thereof. The property measurements obtained at various points of the basin, as described above, are therefore notably utilized, extrapolated and/or interpolated, in the different cells of the gridded representation, according to more or less restrictive hypotheses.

Figure 2:
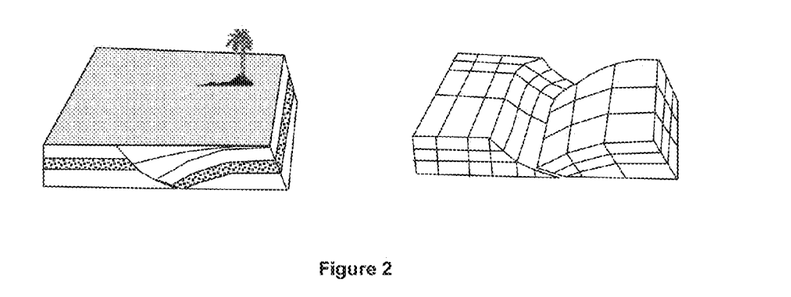
FIG. 2 shows an example of a sedimentary basin (left) and an example of a gridded representation (right) of this basin.

In most cases, spatial discretization of a sedimentary basin is organized in cell layers representing each the various geological layers of the basin being studied. FIG. 2 illustrates, on the left, an example of a sedimentary basin and, on the right, an example of a gridded representation of this basin.

2. Structural Reconstruction

In this stage, past architectures of the basin, from the current time to a geological time t, prior to the current one, are reconstructed. The gridded representation constructed in the previous stage is therefore deformed in order to represent the anti-chronological evolution of the subsoil architecture over geological times, and for each time step of the simulation. A gridded representation is thus obtained for each time step of the simulation, from the current time to the geological time t.

According to an embodiment of the present invention, structural reconstruction can be particularly simple if it is based on the hypothesis that the deformation thereof results only from a combination of vertical movements through sediment compaction or through uplift or downwarp of the basement thereof. This technique, known as backstripping, is described for example in (Steckler and Watts, 1978).

Figure 3:
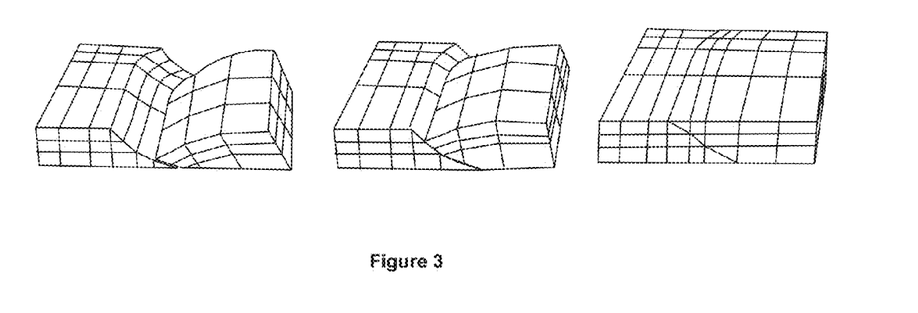
FIG. 3 shows the structural reconstruction, represented by 3 deformation states at 3 different dates, of a sedimentary basin.

According to another embodiment of the present invention, in the case of basins whose tectonic history is complex, notably basins with faults, it is advisable to use techniques with less restrictive hypotheses, such as structural restoration. Structural restoration is for example described in document FR-2,930,350 A corresponding to U.S. Patent Publication No. 2009/0,265,152 A. Structural restoration calculates the successive deformations undergone by the basin by integrating the deformations due to compaction and those resulting from tectonic forces. In the example of FIG. 3, three states are used to represent the subsoil deformation over geological times. The gridded representation on the left shows the current state, where a slipping interface (a fault here) can be observed. The gridded representation on the right shows the same sedimentary basin at a geological time t, prior to the current one. At this time t, the sedimentary layers were not yet fractured. The central gridded representation is an intermediate state, which represents the sedimentary basin at a time t' contained between time t and the current time. It can be seen that slipping has started to modify the basin architecture.

3. Basin Simulation

In this stage, a basin simulation is carried out, which allows accounting for, among other things, the formation of biogenic gas over time and of the transport within the basin of at least part of this biogenic gas, in dissolved form, by advection. According to the invention, an amount of free gas, that is non-dissolved gas, is deduced therefrom.

According to the invention, a simulator according to the prior art is used, which allows calculation of at least the following quantities for each time step and in each cell of the gridded representation of the time step being considered: temperature, pressure, porosity and density of the rock contained in the cell being considered, water velocities and the TOC (organic matter concentration). According to an embodiment of the present invention, the basin simulator used also allows calculation of the amount of hydrocarbons of thermogenic origin. Calculation of these quantities is for example described in (Schneider et al., 2000).

Thus, the basin simulator used for implementing the present invention allows discretion and solution of the equations (see for example Schneider et al., 2000) modelling the processes simulated by the basin simulation in the gridded representations obtained with the structural reconstruction stage described above, to which a "backward" dynamics is applied. Thus, the grid at the start of a basin simulation stage corresponds to the grid obtained at the end of the structural reconstruction stage described above, and then this grid evolves towards the current state thereof, which also corresponds to the initial grid of the structural reconstruction stage described above.

According to the invention, at least stages 3.1 and 3.2 are carried out for each time step n of a basin simulation and for each cell of the gridded representation representative of the basin at the time step considered.

3.1 Hydrocarbon Amount Estimation

This stage estimates the amount of hydrocarbons present in the cell considered at the time step n considered.

According to the invention, the amount of hydrocarbons present in the cell considered at time step n is estimated by calculating an amount of hydrocarbons produced at the time step n, to which the amount of hydrocarbons present at the end of the previous time step n−1 in this cell is added.

According to the invention, calculation of the amount of hydrocarbons produced at time step n in the cell being considered comprises at least calculating the total amount of biogenic gas $M_{bio,n}$ produced in the cell considered for the time step n.

According to an embodiment of the present invention, part of the biogenic gas produced in the cell being considered at time step n is a biogenic gas of primary origin, produced by biodegradation of the organic matter present in the cell being considered. According to an embodiment of the invention, mass $M_{bio1,n}$ of primary biogenic gas produced during a time step n in a cell containing organic matter is calculated with a formula of the type:

$$M_{bio1,n} = r \cdot (a_0 + A(t))^b \cdot e^{-\frac{(T-T_0)^2}{\lambda}} \frac{K_M}{K_M+c} \cdot TOC \cdot \frac{s \cdot m_{gaz}}{m_C} \cdot \rho_{roche} \quad (1)$$

where:

$K_M$ is a constant, referred to as Monod constant; by default, $K_M$=30 mM (moles/m³);

R is an adjustment parameter, expressed in Ma⁻¹; by default, r=0.16 Ma⁻¹;

b is a second adjustment parameter; by default, b=−0.95;

$a_0$ is a constant characterizing the sediment exposure time to some chemical changes at burial start, in years; by default, $a_0$=30,000 a;

$\rho_{roche}$ is rock density;

A(t) is cell deposition age, in years;

$T_0$ is the temperature at which bacterial activity is maximum; by defect, T0=303K;

T is the temperature (in K), in the cell being considered at the time step being considered;

Λ is a third adjustment parameter; by default, λ=−369.33 K²;

S is a stoichiometry parameter; 1 mole of C is converted to s moles of gas; by default, s=0.5;

$m_{gaz}$ is the molar mass of gas;

$m_C$ is the molar mass of carbon;

TOC is the initial organic matter concentration;

and the values (other than the default values given above) of parameters r, b, λ, $a_0$ can be predefined from general knowledge to those individuals working in the field.

According to an embodiment of the present invention, part of the biogenic gas produced in a cell is a biogenic gas of secondary origin, produced by the biodegradation of hydrocarbons in the cell being considered. According to a preferred embodiment of the invention, mass $M_{bio2,n}$ of secondary biogenic gas produced during a time step n in a hydrocarbon-impregnated cell is calculated with a formula of the type:

$$M_{bio2,n} = N_{bact}(z) \cdot C_{bact} \cdot E \frac{m_{gaz}}{m_C} \quad (2)$$

where:

$C_{bact}$ is consumption of a bacterium in mass of carbon during the time step;

E is the percentage of the rock volume affected by biodegradation;

$N_{bact}$ is the number of bacteria per rock volume, expressed as a function of depth z;

$m_{gaz}$ is the molar mass of the gas produced;

$m_C$ is the molar mass of the carbon; and and the values of parameters Cbact, E, Nbact can be predefined by from general knowledge to those individuals working in the field.

According to an embodiment of the present invention, the total amount of biogenic gas $M_{bio,n}$ present in the cell being considered at time step n is obtained by adding the amounts of primary $M_{bio1,n}$ and secondary $M_{bio2,n}$ biogenic gas produced at time step n to the total mass of biogenic gas $M_{bio,n-1}$ contained in the cell at the previous time step n−1, is expressed by equation:

$$M_{bio,n} = M_{bio,n-1} + M_{bio1,n} + M_{bio2,n} \quad (3)$$

According to an embodiment of the present invention, an amount of hydrocarbons formed by thermogenesis is also calculated (see for example Schneider et al, 2000) in the cell being considered and at the time step being considered, and this amount of hydrocarbons formed by thermogenesis is accounted for in the calculation of the total amount of hydrocarbons present in the cell considered at the time step being considered.

3.2 Hydrocarbon Migration Calculation

This stage determines into which cell(s) the hydrocarbons present in a given cell at a time step n will migrate. An assessment is then made in order to know the gas concentrations.

According to the invention, at least part of the biogenic gas present in a cell at a time step n is dissolved in the water present in this cell and transported by this water (advection phenomenon).

3.2.1 Calculation of the Dissolved Biogenic Gas Amount

In this substage, the amount $M_{d,n}$ of biogenic gas is calculated, which is dissolved in the water contained in the cell being considered at the time step n being considered.

According to an embodiment of the present invention, a maximum mass of solubilizable biogenic gas $Msol_{max}$ is first determined in the cell being considered at the time step n.

According to an embodiment of the present invention, a model of biogenic gas solubility in water is used to calculate the maximum mass of solubilizable biogenic gas in the cell being considered at the time step n being considered. The solubility depends in the first place on the pressure, the temperature and the composition of the water in dissolved elements.

According to an embodiment of the present invention where the biogenic gas is methane, and where the biogenic gas is dissolved in pure water, solubility $c_{max}$ can be expressed with an empirical formula of the following type, after (Duan and Mao, 2006):

$$c_{max} = e^{(ln(P) - G(P,T))} \qquad (4)$$

where:

$$G(P, T) = c_1 + c_2 T + \frac{c_3}{T} + c_4 T^2 + \frac{c_5}{T^2} + c_6 P + c_7 PT + \frac{c_8 P}{T} + \frac{c_9 P}{T^2} + c_{10} P^2 T$$

with:
- $C_1 = 8.3144$;
- $C_2 = -0.7277 \cdot 10^{-3}$;
- $C_3 = 0.2149 \cdot 10^4$;
- $C_4 = -0.1402 \cdot 10^{-4}$;
- $C_5 = -0.6674 \cdot 10^6$;
- $C_6 = 0.7699 \cdot 10^{-2}$;
- $C_7 = -0.5025 \cdot 10^{-5}$;
- $C_8 = -3.009$;
- $C_9 = -0.4847 \cdot 10^3$;
- $C_{10} = 0$;

P is the pressure in bars in the cell being considered at the time step considered;

T is the temperature in K in the cell being considered at the time step considered.

According to another embodiment of the invention, where the biogenic gas is methane, and where the biogenic gas is dissolved in saline water, solubility $c_{max}$ of the methane is determined from a solubility model accounting for the salinity of the water, as described for example in (Duan and Mao, 2006).

According to an embodiment of the present invention, the maximum amount of solubilizable gas $Msol_{max}$ in a cell at a time step n is calculated with a formula:

$$Msol_{max} = Volume_{maille} \cdot \varphi \cdot c_{max} \qquad (5)$$

where $\varphi$ is the porosity of the rock in the cell being considered and $Volume_{maille}$ is the volume of the cell being considered.

According to an embodiment where it is considered that the biogenic gas present in a cell can only undergo dissolution in the water present in the cell, the amount of dissolved gas $M_{d,n}$ in the water at time step n than can then be obtained is as follows:

$$M_{d,n} = Min(Msol_{max}, M_{bio,n}) \qquad (6)$$

And, according to the same embodiment of the invention, the amount of free gas $M_{L,n}$ present in the cell being considered at the time step n being considered can then be obtained as follows by a relationship:

$$M_{L,n} = M_{bio,n} - M_{d,n} \qquad (7)$$

According to another embodiment of the present invention, part of the biogenic gas present in the cell being considered at time step n is retained in the cell through an adsorption mechanism. According to an embodiment of the present invention, adsorption is considered to occur on the organic matter present in the cell and according to the Langmuir model (Langmuir, 1916). In this case, the maximum mass of adsorbable gas $Mads_{max,n}$ is expressed in g per volume of rock and it can be obtained with a formula:

$$Mads_{max} = TOC_{tot} \cdot y_{max} \cdot \frac{\beta e^{\alpha/T} \cdot P}{1 + \beta e^{\alpha/T} \cdot P} \cdot \rho_{roche} \qquad (8)$$

wherein:
- $TOC_{tot}$ is an amount of organic carbon on which adsorption occurs, in g/kg rock;
- $\rho_{roche}$ is density of the rock in kg/m$^3$;
- $y_{max}$ is the maximum adsorption capacity, in g gas per g organic carbon which by default, $y_{max} = 0.01$ g/g$_{OC}$;
- $\alpha$ and $\beta$ are the 2 parameters of the Langmuir adsorption model. By default, $\alpha = 2100K$ and $\beta = 1$ MPa$^{-1}$.

According to the same embodiment, the amount $M_{ads,n}$ of potentially adsorbable gas in the cell being considered at time step n can then be obtained by the relationship as follows:

$$M_{ads,n} = Min(M_{bio,n}, Mads_{max}) \qquad (9)$$

According to an embodiment of the present invention, the amount of biogenic gas dissolved in the poral water in the basin is calculated considering that the biogenic gas preferably saturates the adsorption sites, and the rest can then saturate the poral water until maximum solubility is reached. The amount $M_{d,n}$ of biogenic gas available after adsorption possibly for solubilization in the cell being considered and at the time step n considered can then be obtained as follows:

$$M_{d,n} = Min(Msol_{max}, (M_{bio,n} - M_{ado,n})) \qquad (10)$$

According to an embodiment of the present invention, if, after adsorption, then after dissolution of the gas in the water an excess biogenic gas remains, it is assumed that the gas constitutes a vapor phase which is referred to as free gas which is separate from the aqueous phase. The amount of free gas $M_{L,n}$ of biogenic origin in the cell considered at the time step n considered is then defined as follows:

$$M_{L,n} = M_{bio,n} - M_{ads,n} - M_{d,n} \qquad (11)$$

Thus, depending on the solubility of the gas, and therefore in the first place on the pressure and temperature conditions, the biogenic gas present in a cell will be more or less present in free form, which may lead varying significant economically interesting gas accumulations.

3.2.2 Calculation of the Advective Transport of Dissolved Biogenic Gas

This substage models the advective transport of the amount $M_{d,n}$ of dissolved gas in the poral water for the cell being considered at the time step n being considered.

According to an embodiment of the present invention, the transport of a gas dissolved in water, by displacement of the water, that is by advection, is modelled with a single-phase transport equation of the type:

$$\frac{\partial}{\partial t}(\rho_w \varphi c) + div(\rho_w \varphi c \vec{V}_w) = 0 \qquad (11)$$

with:
φ being porosity [su],
c being dissolved gas concentration [g/L water], with c such that $M_d = c/\varphi$ and $M_d$ is the mass of dissolved gas,
$\rho_w$ being density of the water [g/L],
$\vec{V}_w$ being velocity of the water [m/s].

The values of these parameters are for example calculated by a numerical basin simulation based on the document (Schneider et al., 2000). The velocity of the water is notably obtained by solving Darcy's equations that govern flows in porous media (de Marsily, 1986).

Using the water mass conservation, Equation (11) above is rewritten as follows:

$$\rho_w \varphi \frac{\partial}{\partial t}(c) + div(\rho_w \varphi c \vec{V}_w) - c\,div(\rho_w \varphi \vec{V}_w) = 0 \qquad (12)$$

According to the invention, Equation (12) above is discretized in time, according to the time steps of the basin simulation, and in space, according to the cells of the gridded representation of the basin being studied. According to an embodiment of the present invention, after a time step n of duration $\Delta t$, the concentration $c_n$ at the end of time step n in the cell being considered is a solution to the discrete equation:

$$M_w^n c^n - \Delta t \Sigma_\delta (c_{\delta,amt}^n - c^{n-1}) \text{Flux}_{w\delta}^n = M_w^{n-1} c^{n-1} \qquad (13)$$

where:
$c_{\delta,amt}^n$ is the value of the dissolved gas concentration in the cell upstream from the current cell, according to the sign of the water flux $\text{Flux}_{w\delta}^n$, at the time step;
$\varphi^n$ is the porosity in the cell being considered at time step n;
$\rho_w^n$ is the density of the water in the cell being considered at time step n;
$M_w^n = \rho_w^n \varphi^n \text{Vol}^n$, the mass of water in the cell considered at time step n;
$\text{Flux}_{w\delta}^n$ is an approximation of the mass flux of dissolved gas-containing water through edge $\delta$ of the cell considered at time step n; and
the values of the above parameters are estimated for example as described in (Schneider et al., 2000).

Then, the mass of gas $M_{advection,n}$ transported by advection into the cell being considered at the end of time step n can be calculated by the relationship as follows:

$$M_{advection,n} = \frac{c^n}{\varphi^n} \qquad (14)$$

According to an embodiment of the invention, the amount $M_{L,n}$ of free gas of biogenic origin present in the cell being considered and calculated in stage 3.2.1 described above can be the subject of a separate-phase transport simulation at the time step n being considered, using a basin simulator according to the prior art. In the case of a basin simulator based on ray-tracing migration modelling (Sylta, 1991), the migration can be calculated at the end of each migration event, and not necessarily at each time step of the simulation. In the case of a basin simulator based on migration modelling according to Darcy's law formalism (Schneider, 2003), the migration is calculated at the end of each time step of the simulation. At the end of the free gas migration simulation for a time step n or for a given migration event, the amount of free gas $M_{L,n}$ is updated by the basin simulator according to the prior art in each cell of the gridded representation associated with the time step or the migration event.

Then, according to the invention, at the end of each time step n and prior to entering the loop of time step n+1, the total amount $M_{bio,n}$ of gas of biogenic origin in the cell being considered is updated in each cell as follows:

$$M_{bio,n} = M_{ads,n} + M_{L,n} + M_{advection,n} \qquad (15)$$

Thus, according to the invention, at the end of a time step n, the total amount $M_{bio,n}$ of gas of biogenic origin in a given cell corresponds to the sum of amount $M_{ads,n}$ of biogenic gas adsorbed in the cell at time step n, amount $M_{L,n}$ of free biogenic gas in the cell at time step n and the amount $M_{advection,n}$ of biogenic gas transported by advection into the cell.

Furthermore, according to an embodiment of the invention, the transport of hydrocarbons originating from thermal cracking of organic matter (that is thermogenesis) is also taken into account by use of a basin simulator according to the prior art. This transport can be simulated for example with the ray tracing method (Sylta, 1991), the invasion-percolation method (Carruthers, 1998) or by solving the generalized Darcy's equations (Schneider, 2003).

4. Development of the Sedimentary Basin

At the end of the previous stages, repeated for each cell and for each time step of the basin simulation, at least the amount of free gas of biogenic origin present in each cell of the gridded representation at the current time is available.

Besides, depending on the basin simulator used for implementing the invention, the following information can for example be obtained:
i. the emplacement of the sedimentary layers,
ii. the compaction thereof under the weight of the overlying sediments,
iii. the heating thereof during burial,
iv. the fluid pressure changes resulting from this burial,
v. the formation of hydrocarbons by thermogenesis,
vi. the displacement of these hydrocarbons in the basin under the effect of buoyancy, capillarity, pressure gradient differences, underground flows,
vii. the amount of hydrocarbons formed by thermogenesis in the cells of the gridded representation of the basin.

From such information, then have knowledge of the zones of the basin corresponding to cells of the gridded representation at the current time of the basin is available, comprising hydrocarbons, as well as the amount, the nature and the pressure of the hydrocarbons trapped therein. Then the zones of the basin to be studied can be selected with the best petroleum potential.

The petroleum development of the basin can then take a variety of forms, notably:
exploration drilling in the various zones selected having the best potential, to confirm or to invalidate the previously estimated potential and to acquire new data for fuelling new and more precise studies;

development drilling (production or injection wells) for recovery of the hydrocarbons present within the sedimentary basin in the zones selected for having the best potential.

Computer Program Product

Furthermore, the invention concerns a computer program product downloadable from a communication network and/or recorded on a non-transient computer-readable medium and/or processor executable, comprising program code instructions for implementing the method as described above, when the program is executed on a computer.

Application Example

The features and advantages of the method according to the invention will be clear from reading the application example below.

The sedimentary basin being studied corresponds to the Levant basin in the Mediterranean Sea. This basin currently undergoes intensive petroleum exploration and the presence of "dry" (almost pure) methane reservoirs is now established. The purity of this gas suggests a biogenic origin. The application of the present invention, by taking into account the possible transport of biogenic gas by advection, has a goal of providing a more reliable prediction of the position of economically interesting reservoirs.

Figure 4A:
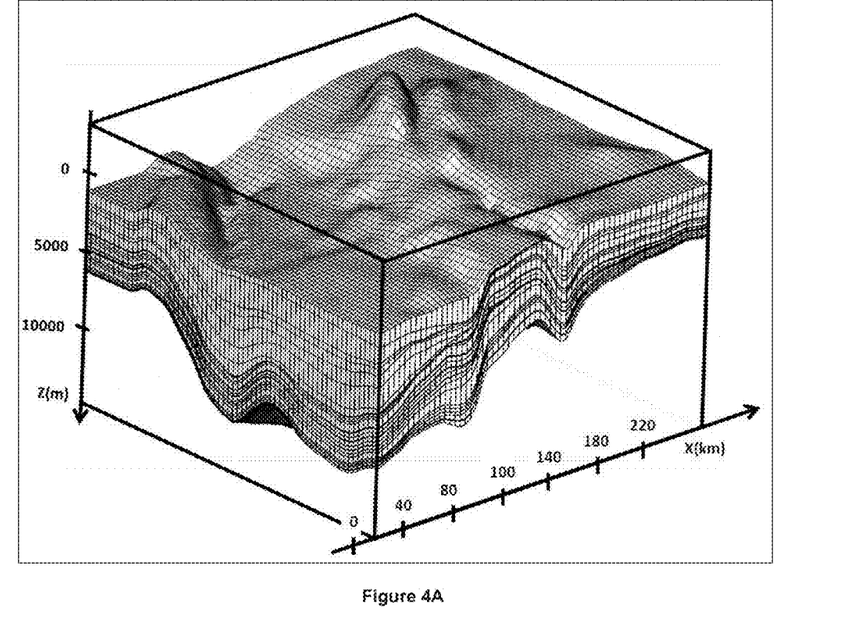
FIG. 4A shows an example of a sedimentary basin having of 30 layers and 122,880 cells.

A gridded representation of this basin is shown in FIG. 4A. The basin covers a surface area of approximately 50,000 km$^2$, for a depth locally exceeding 10 km. The basin is discretized into 30 layers with 122,880 cells.

The structural reconstruction of this basin was performed with a backstripping method over a period of 299 million years corresponding to the age of the basin.

Only the formation of primary biogenic gas has been taken into account when implementing the present invention. Possible gas formation through secondary biodegradation has not been taken into account.

Moreover, adsorption of the dissolved biogenic gas has not been taken into account in this example of implementation of the invention.

The values of the parameters used for modelling the production of biogenic gas by primary biodegradation (see Equation 1) are as follows:
initial TOC (amount of organic matter in the sediments at the time of deposition): 1%, with 60% refractory to bacterial degradation, 30% requiring prior thermal transformation and 10% directly usable by microorganisms,
$K_M$ is 30 mM,
r is 0.16 Ma$^{-1}$,
b is −0.95,
$a_0$ is 30,000 a,
λ is −369.33 K$^2$.

Figure 4B:
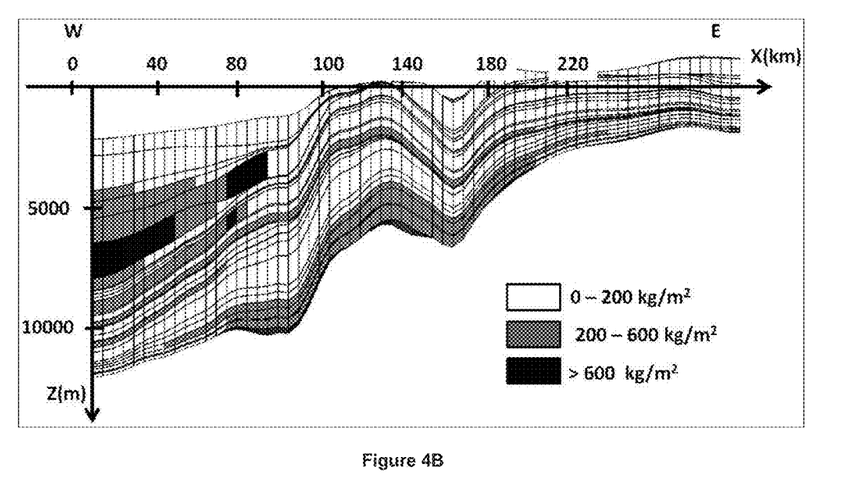
FIG. 4B shows the cumulative mass of methane produced in each cell of a vertical section of the basin shown in FIG. 4A, from the birth of the basin to the current age, calculated with the method according to the invention and expressed in kg/m² of layer.
Figure 4C:
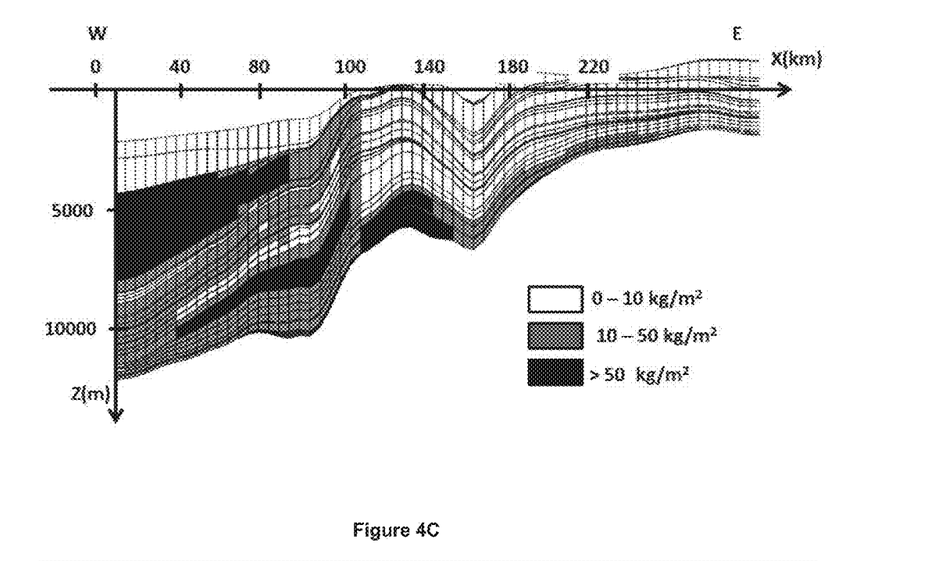
FIG. 4C shows the cumulative mass of gas dissolved in each cell of the vertical section shown in FIG. 4B, from the birth of the basin to the current age, calculated with the method according to the invention and expressed in kg/m² of layer.
Figure 4D:
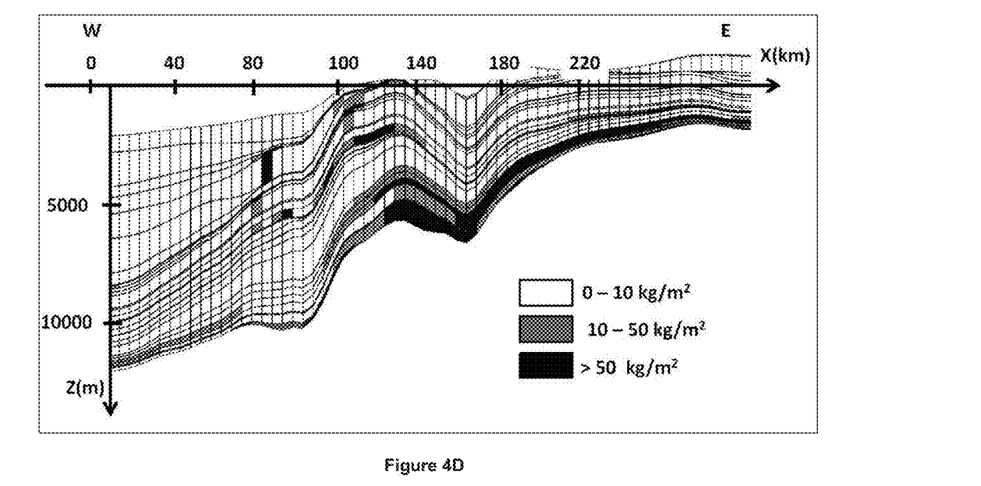
FIG. 4D shows the cumulative mass of methane released as free gas in each cell of the vertical section shown in FIG. 4B, from the birth of the basin to the current age, calculated with the method according to the invention and expressed in kg/m² of layer.

FIGS. 4B, 4C and 4D show results obtained with the method according to the invention, applied from the birth of the basin to the current time, that is a simulation duration of 299 million years, split into 27 migration events and several hundred time steps. The results are shown in these figures for the same vertical section traversing the basin, formed by a vertical axis (Z) and an east (E)/west (W) axis.

FIG. 4B shows the cumulative mass of methane produced in each cell per unit of area of the layer, throughout the simulation duration. It can be observed that the maximum biogenic gas production zone is located to the west (W) of the basin, corresponding to the major organic matter deposit zones.

FIG. 4c shows the cumulative mass of dissolved gas in each cell per unit of area of the layer, throughout the simulation duration. It can be observed that the largest amounts of dissolved gas are located to the west (W) of the basin, in the thickest zones of the basin, which is also where the production of biogenic gas is the largest.

FIG. 4D shows the initial cumulative mass of methane released as free gas, obtained after dissolution of the biogenic gas, then advective transport, in each cell and per unit of area of the layer, and then throughout the simulation duration. It can be seen that the production of free gas does not occur in the maximum biogenic gas production zone, but in the less deep zones located to the east (E) of the model. This trend shown by the method according to the invention can be attributed to the advective transport of the biogenic gas dissolved in the poral water in the basin, from the deep zones of the basin to the west (W) to the less deep zones to the east (E), under the effect of the compaction due to the sedimentary overload in the west (W), favorable to displacement of the poral basin water. The fact that the sediments located to the east (E) spend more time in a relatively shallow range of depths and in a temperature range favoring the generation of biogenic gas, but which is unfavorable to the solubilization thereof, also contributes to this result.

Thus, the application of the method according to the invention shows that, for this basin, the deeper layers are the most favorable to gas production and that this gas feeds, through an advection phenomenon, methane reservoirs located at shallower depths.

Thus, the method according to the invention, by taking into account the advective transport of at least part of the biogenic gas dissolved in basin water, allows reliable determination the location of potential hydrocarbon reservoirs.

The invention claimed is:

1. A method of developing a sedimentary basin comprising hydrocarbons, using a basin simulator for reconstructing, for a succession of time steps, geological and geochemical processes affecting the basin from a geological time t to a current time, from measurements of properties relative to the basin, comprising:
   A. constructing a gridded representation representative of the basin at the current time from the measurements;
   B. from the gridded representation at the current time, constructing a gridded representation of the basin for each of other time steps through reconstruction of architecture of the basin for the other time steps;
   C. using the simulator and the gridded representations of the basin for the time steps, to carry out at least the following for each of the time steps, from the geological time t to the current time, and for each cell of the gridded representation by:
      i. determining at least one amount of biogenic gas produced in each cell at each time step;
      ii. determining at least one amount of biogenic gas dissolved in water present in each cell at each time step, and determining therefrom an amount of free biogenic gas in each cell at the time step;
      iii. accounting for at least advective transport produced by velocity of water flowing in the basin of the biogenic gas dissolved in the water in each cell at the time step; and
   D. selecting at least one zones of the basin corresponding to cells of the gridded representation of the basin at the current time comprising hydrocarbons; and
   developing the basin as a function of the selected at least one zone by performing at least one of exploration drilling in the at least one zone having a best potential production of the hydrocarbons for determining correctness of any previously estimated potential production and to acquire new data and drilling for recovering the hydrocarbons in the selected at least one zone; and wherein an amount of biogenic gas dissolved in the water is determined for each time step and in each of the gridded representations obtained for each time steps by:

a) calculating a total amount of biogenic gas in each cell for each time step by adding an amount of biogenic gas produced at each time step and an amount of biogenic gas present in the cell at a previous time step;

b) determining a maximum amount of biogenic gas solubilizable in water in each cell at each time step; and c) determining an amount of biogenic gas dissolved in each cell for each time step by selecting a minimum value between the total amount of biogenic gas and a maximum amount of solubilizable biogenic gas.

2. A method as claimed in claim 1, wherein an amount of biogenic gas of primary origin and/or of secondary origin is determined.

3. A method as claimed in claim 2, wherein the amount of the free biogenic gas is determined, for each time step and each cell of the gridded representation obtained for each time step, selecting a difference between a total amount of biogenic gas present each cell at each time step and an amount of biogenic gas dissolved in water of each of the cell at the time step.

4. A method as claimed in claim 3, wherein an amount of biogenic gas adsorbable in each cell at each time step is also determined, and an amount of biogenic gas dissolved in each cell and for each time step is determined considering that the biogenic gas is adsorbed and then dissolved.

5. A method as claimed in claim 2, wherein an amount of biogenic gas adsorbable in each cell at each time step is also determined, and an amount of biogenic gas dissolved in each cell and for each time step is determined considering that the biogenic gas is adsorbed and then dissolved.

6. A method as claimed in claim 1, wherein the amount of the free biogenic gas is determined, for each time step and each cell of the gridded representation obtained for each time step, selecting a difference between a total amount of biogenic gas present each cell at each time step and an amount of biogenic gas dissolved in water of each of the cell at the time step.

7. A method as claimed in claim 6, wherein an amount of biogenic gas adsorbable in each cell at each time step is also determined, and an amount of biogenic gas dissolved in each cell and for each time step is determined considering that the biogenic gas is adsorbed and then dissolved.

8. A method as claimed in claim 1, wherein an amount of biogenic gas adsorbable in each cell at each time step is also determined, and an amount of biogenic gas dissolved in each cell and for each time step is determined considering that the biogenic gas is adsorbed and then dissolved.

9. A computer program product non-transiently recorded on a computer-readable medium which is executable on a processor, comprising program code instructions executed on a computer for developing a sedimentary basin comprising hydrocarbons, using a basin simulator for reconstructing, for a succession of time steps, geological and geochemical processes affecting the basin from a geological time t to a current time, from measurements of properties relative to the basin, comprising:

A. constructing a gridded representation representative of the basin at the current time from the measurements;

B. from the gridded representation at the current time, constructing a gridded representation of the basin for each of other time steps through reconstruction of architecture of the basin for the other time steps;

C. using the simulator and the gridded representations of the basin for the time steps, to carry out at least the following for each of the time steps, from the geological time t to the current time, and for each cell of the gridded representation by:

i. determining at least one amount of biogenic gas produced in each cell at each time step;

ii. determining at least one amount of biogenic gas dissolved in water present in each cell at each time step, and determining therefrom an amount of free biogenic gas in each cell at the time step;

iii. accounting for at least advective transport produced by velocity of water flowing in the basin of the biogenic gas dissolved in the water in each cell at the time step; and D. selecting at least one zone of the basin corresponding to cells of the gridded representation of the basin at the current time comprising hydrocarbons; and developing the basin as a function of the selected at least one zone by performing at least one of exploration drilling in the at least one zone having a best potential production of the hydrocarbons for determining correctness of any previously estimated potential production and to acquire new data and drilling for recovering the hydrocarbons in the selected at least one zone; and wherein an amount of biogenic gas dissolved in the water is determined for each time step and in each of the gridded representations obtained for each time steps by:

a) calculating a total amount of biogenic gas in each cell for each time step by adding an amount of biogenic gas produced at each time step and an amount of biogenic gas present in the cell at a previous time step;

b) determining a maximum amount of biogenic gas solubilizable in water in each cell at each time step; and c) determining an amount of biogenic gas dissolved in each cell for each time step by selecting a minimum value between the total amount of biogenic gas and a maximum amount of solubilizable biogenic gas.

* * * * *